United States Patent
Schulte et al.

(10) Patent No.: US 7,681,374 B2
(45) Date of Patent: Mar. 23, 2010

(54) DEVICE FOR PRODUCING PACKING UNITS FROM AT LEAST TWO PACKS

(75) Inventors: Josef Schulte, Aschendorf (DE); Wolfgang Kern, Bad Zwischenahn (DE)

(73) Assignee: Focke & Co. (GmbH & Co. KG) (DE)

( * ) Notice: Subject to any disclaimer, the term of this patent is extended or adjusted under 35 U.S.C. 154(b) by 435 days.

(21) Appl. No.: 11/572,411

(22) PCT Filed: Jun. 30, 2005

(86) PCT No.: PCT/EP2005/007027

§ 371 (c)(1), (2), (4) Date: Jan. 19, 2007

(87) PCT Pub. No.: WO2006/010427

PCT Pub. Date: Feb. 2, 2006

(65) Prior Publication Data
US 2008/0092490 A1 Apr. 24, 2008

(30) Foreign Application Priority Data
Jul. 26, 2004 (DE) .......... 10 2004 036 162

(51) Int. Cl.
 B65B 35/56 (2006.01)
 B65B 35/58 (2006.01)
 B65G 47/248 (2006.01)
(52) U.S. Cl. .......... 53/143; 53/544; 198/374; 198/402
(58) Field of Classification Search .......... 53/446, 53/544, 142, 143; 198/374, 402; B65B 35/56, B65B 35/58; B65G 47/248
See application file for complete search history.

(56) References Cited

U.S. PATENT DOCUMENTS

| 2,929,489 A | * | 3/1960 | Parrish | 198/405 |
| 2,965,215 A | * | 12/1960 | Molins | 198/405 |
| 3,252,384 A | | 5/1966 | Beert et al. | |
| 3,294,257 A | * | 12/1966 | Davies et al. | 198/374 |
| 3,396,507 A | * | 8/1968 | Morris et al. | 53/142 |
| 3,785,473 A | * | 1/1974 | Cook | 198/402 |
| 4,067,433 A | * | 1/1978 | Phipps | 198/374 |

(Continued)

FOREIGN PATENT DOCUMENTS

CH 652368 A5 11/1985

(Continued)

OTHER PUBLICATIONS

International Search Report for PCT/EP2005/007027.
DE Search Report for DE 102004036162.2.

*Primary Examiner*—Stephen F Gerrity
(74) *Attorney, Agent, or Firm*—Smith, Gambrell & Russell

(57) ABSTRACT

A method and device to form packing units (12) consisting of at least two packs (10, 11). To this end, the successively conveyed packs (10, 11) are tilted by 90° in the region of a turning line (20) in such a way that the associated packs (10, 11) are oriented towards each other in the correct relative position for the packing unit (12). Every second pack (11) is delayed during the turning process so that it can be oriented towards the associated pack (10).

11 Claims, 4 Drawing Sheets

U.S. PATENT DOCUMENTS

| | | | |
|---|---|---|---|
| 4,672,795 A | | 6/1987 | Alexander et al. |
| 4,771,589 A | * | 9/1988 | Mueller et al. ................. 53/446 |
| 4,776,148 A | * | 10/1988 | Mingozzi ..................... 53/143 |
| 5,090,553 A | * | 2/1992 | Focke .................... 198/377.06 |
| 5,395,207 A | * | 3/1995 | Hoffman ..................... 53/446 |
| 5,417,037 A | * | 5/1995 | Osti et al. ..................... 53/446 |
| 5,488,815 A | * | 2/1996 | Abrams et al. ................. 53/544 |
| 5,560,183 A | * | 10/1996 | James ......................... 53/446 |
| 5,647,190 A | * | 7/1997 | Minarelli et al. .............. 53/446 |
| 6,186,312 B1 | | 2/2001 | Schererz |
| 6,681,547 B1 | * | 1/2004 | Wild et al. .................... 53/446 |

FOREIGN PATENT DOCUMENTS

| | | | |
|---|---|---|---|
| DE | 3906635 A1 | * | 9/1990 |
| FR | 2171992 A | | 9/1973 |
| JP | 05178327 A | * | 7/1993 |
| JP | 11157508 A | * | 6/1999 |

* cited by examiner

DEVICE FOR PRODUCING PACKING UNITS FROM AT LEAST TWO PACKS

STATEMENT OF RELATED APPLICATIONS

This patent application is the Patent Cooperation Treaty (PCT) Chapter II National Phase of, and claims priority on, PCT International Patent Application No. PCT/EP2005/007027 having an International Filing Date of 30 Jun. 2005, which claims priority on German Patent Application No. 10 2004 036 162.2 having a filing date of 26 Jul. 2004, both of which are incorporated herein by this reference.

BACKGROUND OF THE INVENTION

1. Technical Field

The invention relates to a method for producing packing units from at least two packs whose design, in particular their geometric form, allows them to be fitted together to form the packing unit, preferably in the form of a trapezoidal pack element and subsequent single-sided tab, with the oriented packs being delivered in close sequence by a feed conveyor. Furthermore, the invention relates to a device for performing the method.

2. Related Art

For objects, in particular packs, with matching forms it is the object after completion of the objects or packs to assemble two or more objects or packs, allowing for their special form, to produce a (packing) unit. One example of this are packs for modern razor blades (triple blades) that consist of a pack element with a trapezoidal cross-section and a laterally attached tab. Two packs are assembled in an interlocking relative position to thus form a packing unit.

BRIEF SUMMARY OF THE INVENTION

The object of the invention is to change the relative position of the objects or packs arriving with a matching relative position in such a way that at least two associated packs can be assembled in an interlocking formation to form the packing unit.

In order to achieve this object, the method according to the invention comprises the following features:

a) During the continued transport, the packs are turned in such a way that (two) adjacent packs in each case have a relative position corresponding to the packing unit, b) Every second pack is decelerated or accelerated in its transport speed in such a way that packs assigned to a packing unit are oriented to one another, c) The associated (two) packs of a packing unit are pushed (laterally) and assembled to form a packing unit, d) The packing units formed continuously in this way are transported away at a distance from one another.

In the method according to the invention, the preferably upright packs are brought closely together. All the packs are turned during the continuous transport and oriented by decelerating or accelerating into a relative position necessary for the packing unit. The two packs are assembled to form the packing unit by a lateral movement.

A special feature of the invention consists in that every second pack is diverted laterally out of the plane or travel route of the arriving packs and transported along a second transport route. In the area of this second transport route, the packs are turned. In a preferred embodiment the packs transported further in continuation of the feed conveyor and the packs of the parallel transport route are each turned by 90° in opposite directions, thereby forming the relative position corresponding to the packing unit.

The device according to the invention has in addition to the continued feed conveyor a second, offset conveyor, namely a turning conveyor for every second pack. The packs are thereby turned by means of fixed, correspondingly formed guide organs, in particular by curve-shaped guide rails.

BRIEF DESCRIPTION OF THE DRAWINGS

Further special features of the invention are explained in greater detail below by reference to the drawings.

DETAILED DESCRIPTION OF PREFERRED EMBODIMENTS

Figure 2:
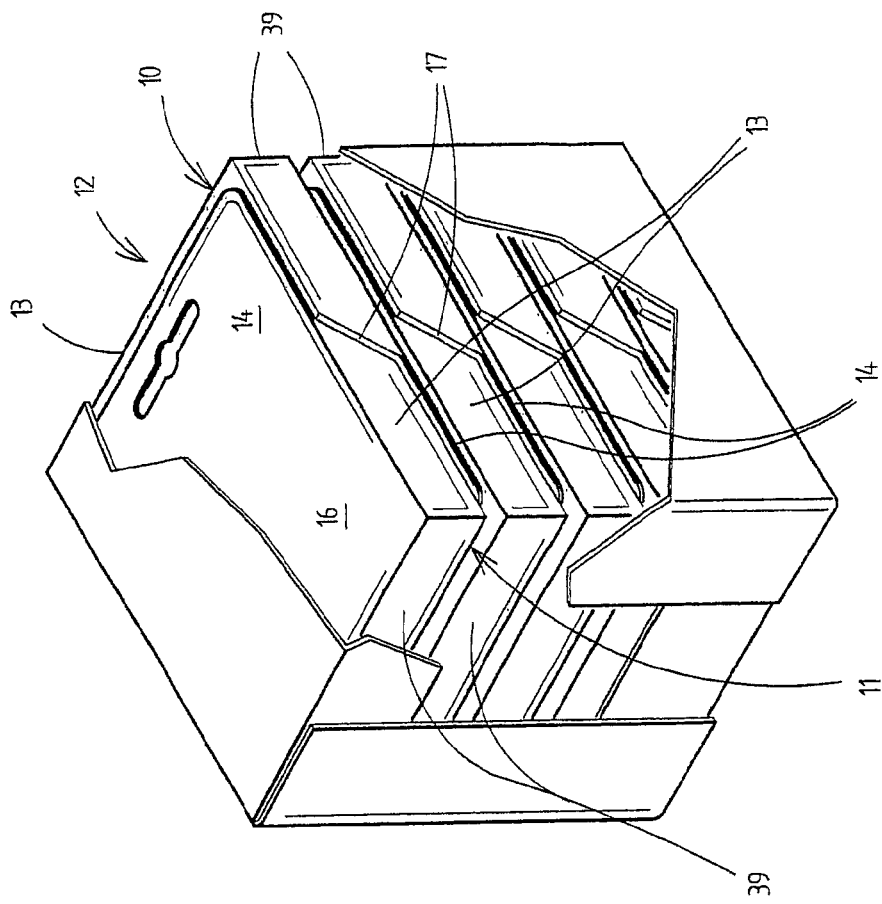
FIG. 2 shows a bulk pack comprising several packing units, also in a perspective view.
Figure 1:
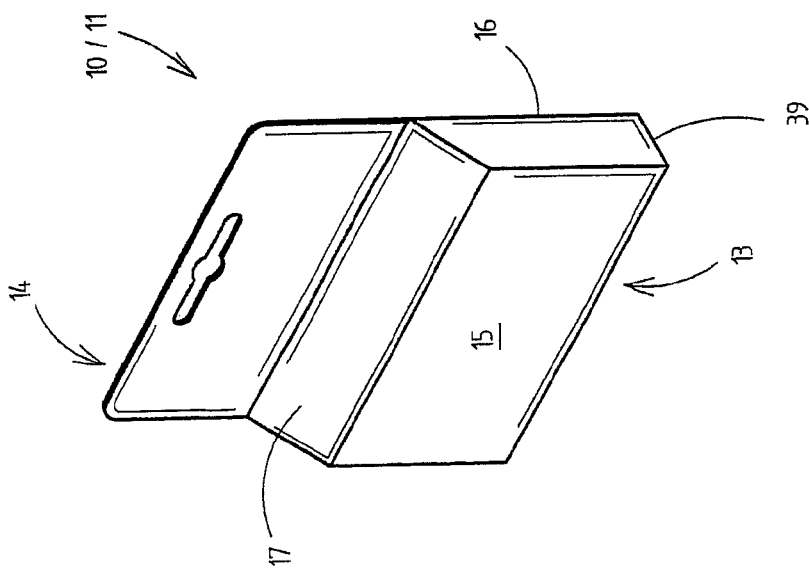
FIG. 1 shows an example of a (single) pack in a perspective view.
Figure 3:
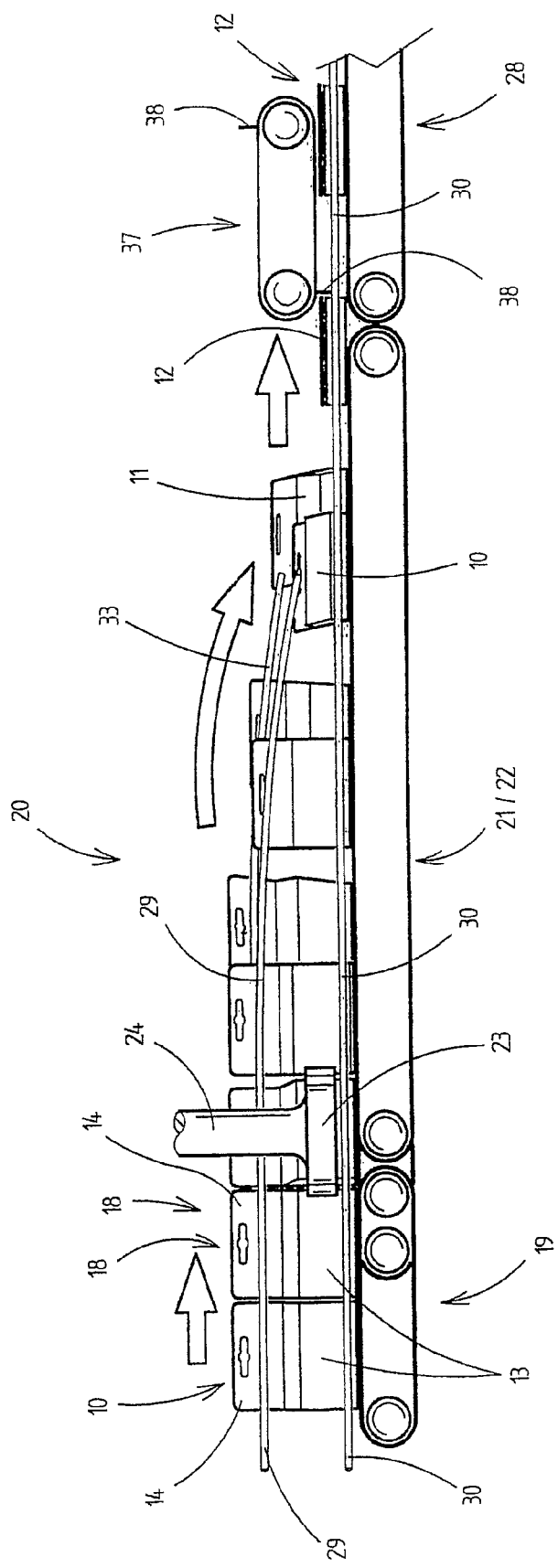
FIG. 3 shows a device for forming packing units in a diagrammatic side view.

In the drawings a pack 10, 11 is shown as an illustrative embodiment that due to its geometric shape is suitable for forming a compact packing unit 12 by means of an interlocking relative position of two packs 10, 11. The packs 10, 11 serve here, for example, to hold triple razor blades. The constructional form is dictated by a pack element 13 and a tab 14 protruding from this element. The pack element 13 has a trapezoidal cross-section with front wall 15, rear wall 16, an inclined side wall 17 and a narrow base wall 39. The relatively rigid protruding tab 14 extends in the extension of the rear wall 16. The dimension of the tab 14 in this direction is slightly smaller than the width or height of the front wall 15.

The packing unit 12 consists of two interlocking packs 10, 11 lying against one another. The inclined side walls 17 of the packs 10, 11 lie against one another.

The tab 14 of the one pack 10, 11 lies against the front wall 15 of the other pack 11, 10 (FIG. 2).

The packing unit 12 forms an exact cubic block that allows the formation of a stack. A bulk pack (FIG. 2) of several packing units 12 lying on top of one another is suitable for shipment and/or presentation.

The packs 10, 11 are delivered by a packing machine or a pack stock in a relative position oriented in the same direction. In order to form the packing units 12, the relative position of the associated packs 10, 11 has to be changed. This is performed during the preferably continuous transport of the packs 10, 11.

In the device illustrated, the packs 10, 11 are delivered by a feed conveyor 19 to form a closely arranged row 18. This has the form of an endless belt. The packs 10, 11 stand in an upright plane with the tab 14 facing upwards, with the base wall 39 resting on the feed conveyor 19.

Downline of the feed conveyor 19, the packs 10, 11 are transferred to a turning line 20. In this area, the relative position of each pair of associated packs 10, 11 is changed in such a way that these are finally oriented in the horizontal plane, corresponding to the formation inside the packing unit 12. This means that in each case one pack 10 is oriented with the rear wall 16 and tab 14 facing downwards and the other pack 11 with the rear wall 16 and tab 14 facing upwards. The inclined side walls 17 are facing one another.

In order to perform the necessary turning movements of the packs 10, 11, these are temporarily transported on different transport routes lying alongside one another. The device is designed for this purpose in such a way that it consists of two turning conveyors 21 and 22. Both are endless conveyors, namely belts. The two turning conveyors 21, 22 lie immediately alongside one another and parallel to one another and can be driven independently of one another.

The first turning conveyor 21 extends in continuation of the feed conveyor 19, and can possibly be formed by this with a corresponding extension. The packs 10 are thus transported further in continuation of the direction of movement of the feed conveyor 19 on the turning conveyor 21.

Figure 4:
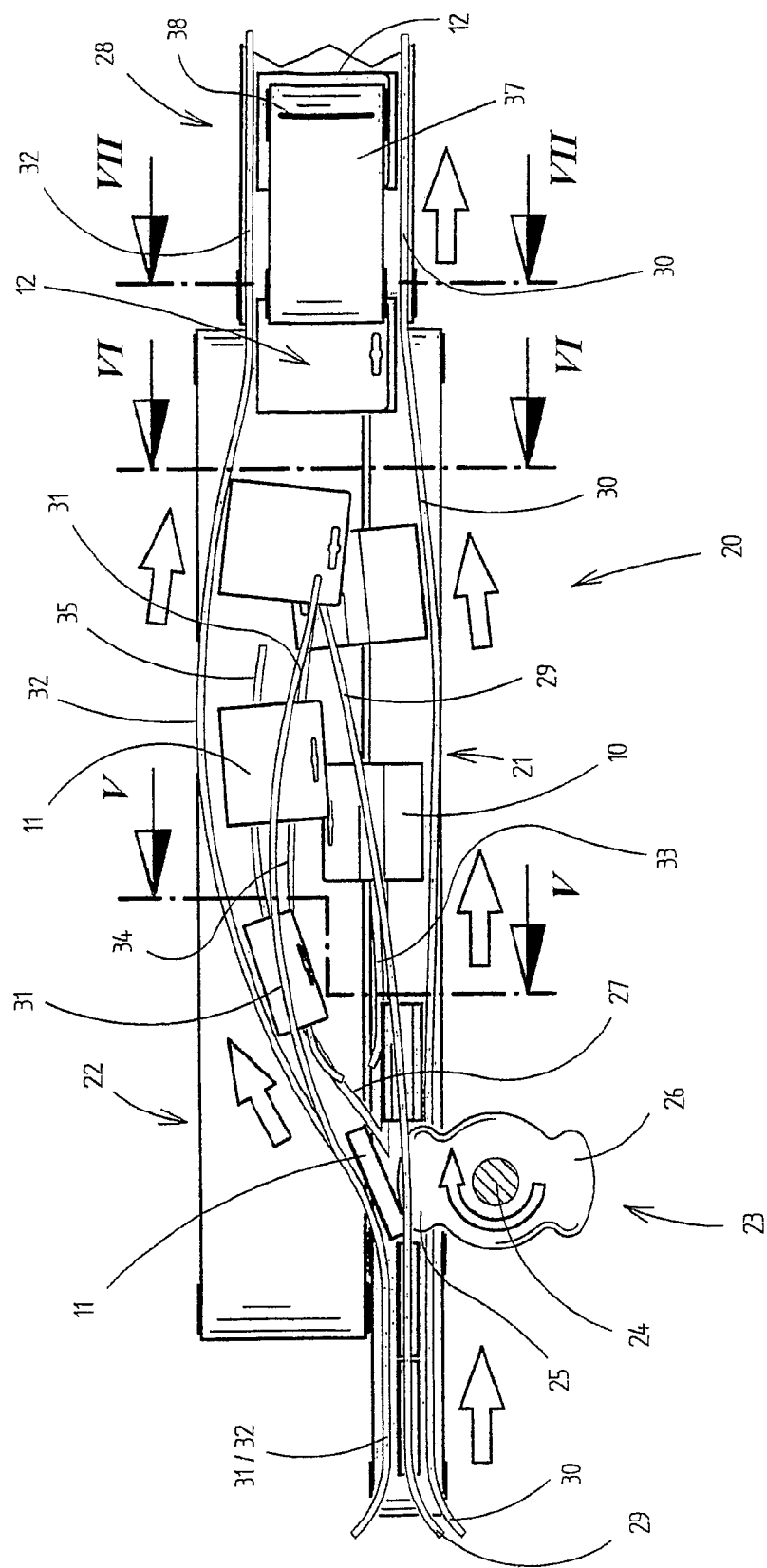
FIG. 4 shows the device according to FIG. 3 in a diagrammatic outline view.

Every second pack 11 is diverted or discharged out of the closely arranged row 18 in transverse direction and inserted into the transport route of the second turning conveyor 22. For this purpose, a discharge element is arranged in the inlet area of the turning line 20, namely a revolving segmented wheel 23 rotating in the horizontal plane with a perpendicular shaft 24. The disc-shaped segmented wheel 23 has several, in the present case two, projections or segments 25, 26. These each come into contact with one side surface of the packs 11 to be discharged, namely here on the front wall 15. For this purpose, the segments 25, 26 enter the travel path of the feed conveyor 19. The rotational movement of the segmented wheel 23 is synchronized to the transport speed of the feed conveyor 19 in such a way that one segment 25, 26 contacts one pack 11 to be diverted in each case. As shown in FIG. 4, the pack 11 in question is moved into an inclined position by the segment 25, 26 and thus enters the area of a fixed deflector 27 that with the continued transport by the feed conveyor 19 and subsequently by the turning conveyor 22 diverts the pack 11 into the area of this turning conveyor 22.

The packs 10, 11 are guided in the area of the feed conveyor 19 and in particular in the area of the turning line 20 by special fixed guide elements that are formed in such a way that during the continued conveying movement a tilting or turning of the packs 10, 11 takes place. In the present illustrative embodiment the process is such that both packs 10, 11 are tilted or turned during transport to form the packing unit 12. Furthermore, the packs 10, 11 are transported at different speeds in the area of the turning line 20, namely in the present case the packs 11 of the turning conveyor 22 are transported at reduced speed in such a way that the associated adjacent packs 10, 11 are oriented to one another at the end of the turning line 20, namely at the transfer point to a discharge conveyor 28.

The guide elements for the packs 10, 11 are designed here as guide rods or guide rails. In the area of the feed conveyor 19 there are two guide rails, namely upper rail 29 and lower rail 30 or 31, 32 on both sides of the packs 10, 11. The rails facing the rear side 31, 32 lie in a common vertical plane, while on the front side the upper rail 29 is offset from the lower rail 30 due to the contact with the tab 14. The guide rails on the front side, namely upper rail 29 and lower rail 30, are arranged in the further course of the turning conveyors 21 in continuation or extension of the feed conveyor 19. In the area of the turning conveyor 21, the lower rail 30 remains a lower lateral limitation for the packs 10, namely at a height above the turning conveyor 21 corresponding to that of the base wall 39 of the pack 10, so that the packs 10 are guided in a horizontal position through the lower rail 30. The lower rail 30 also continues in the area of the subsequent discharge conveyor 28.

Figure 5:
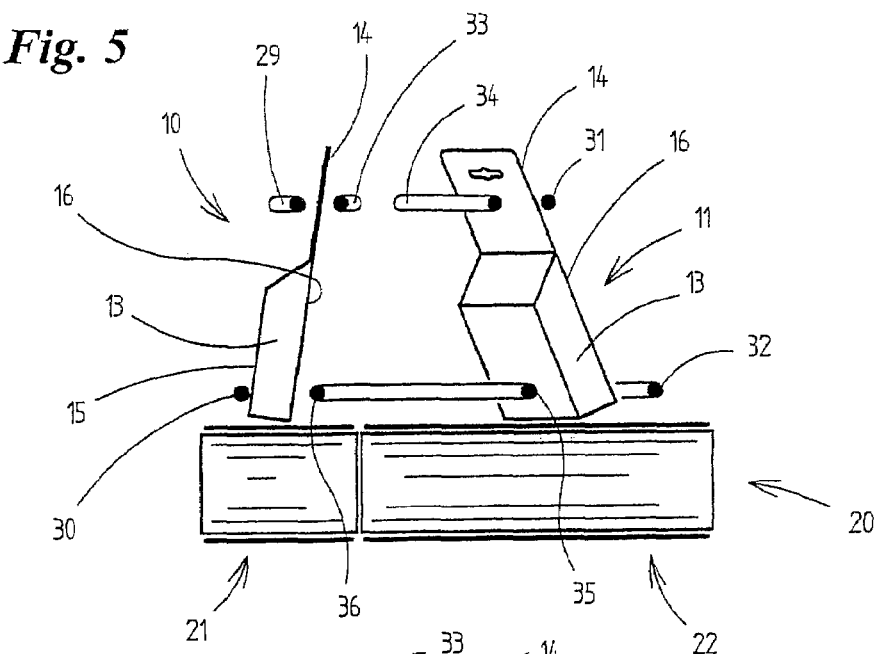
FIG. 5 shows a phase in the turning movement of packs corresponding to cross-section V-V in FIG. 4.
Figure 6:
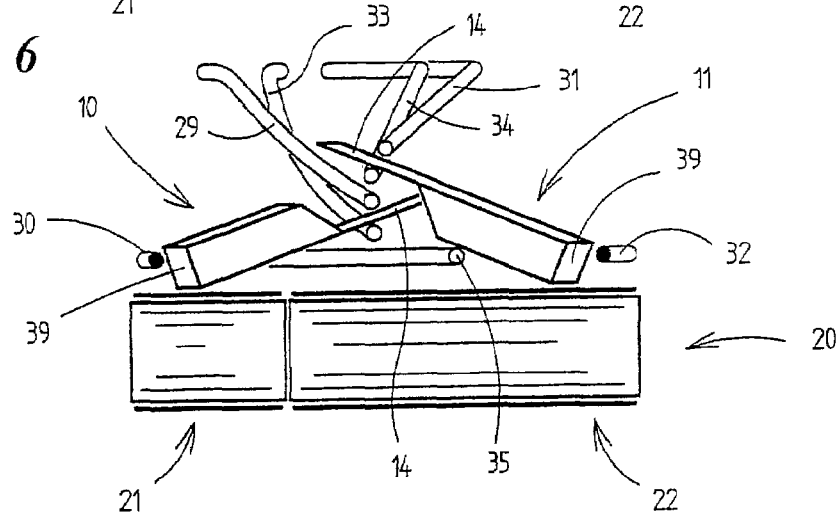
FIG. 6 shows a view of the situation in the section VI-VI of FIG. 4.
Figure 7:
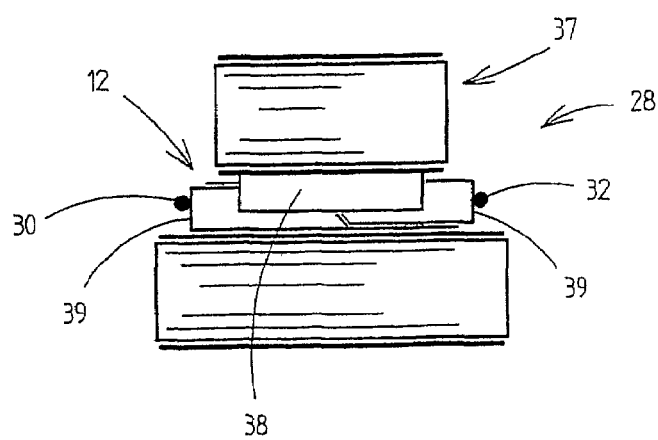
FIG. 7 shows a cross-section in the plane VII-VII in FIG. 4.

The front-side upper rail 29 has a curved shape in the area of the turning conveyor 21 (FIG. 4) such that a tilting movement is exerted on the packs 10 during the transport. In side view, the upper rail 29 is tilted slightly downwards for this purpose so that guidance is assured during the whole tilting movement of the packs 10 out of the upright position into a horizontal position. In the area of the turning conveyor 21, a further guide is located on the side facing towards the turning conveyor 22, namely a supplementary rail 33. This extends essentially in the conveying direction of the packs 10 and serves as a lower support during the tilting movement (FIG. 5, FIG. 6). The supplementary rail 33 thus runs essentially from top to bottom. The packs 10 or their tabs 14 are consequently secured between two guide elements during the tilting movement.

Guide elements of the turning conveyor 22 are designed in a special manner. Upper rail 31 and lower rail 32 from the area of the feed conveyor 19 are deflected outwards at the beginning of the turning line 20 into the area of the turning conveyor 22. They initially still serve as lateral guides for the discharged packs 11. The lower guide, namely lower rail 32, extends at a slight distance above the turning conveyor 22 and acts as an outer guide for the packs 11 in the whole turning area, namely at the height of the base wall 39. The upper rail 31 lies against the rear side of the tab 14 and causes the tilting movement of the packs 11 by having a correspondingly curved course (FIG. 4), and in addition oriented from top to bottom. An opposite guide is also provided for the packs 11 or their tabs 14 during the turning movement, namely an additional rail 34. This lies against the front side of the tab 14. The additional rail 34 also has a downward-oriented course corresponding to the tilting movement. The guide elements for the packs 10, 11 correspond insofar as the thin-walled tabs 14 facing upwards are guided on both sides during the whole tilting and turning process.

The pack elements 13 of the packs 10, 11 are also supported on the inside, namely by supporting rails 35, 36. These extend continuously in the lower area of the packs 10, 11, namely at the height of the lower rails 30, 32. The supporting rails 35, 36 are arranged as a continuation of the fork-shaped or wedge-shaped deflector 27. These supporting rails 35, 36 also follow the course of the tilting movements.

The inner supporting and guide elements for the packs 10, 11 terminate in the area of the turning line 20 after completion of the tilting movements, so that in the end phase the packs 10, 11 lie alongside one another with partially overlapping tabs 14. The form of the lower rails 30, 32 brings the associated packs 10, 11 together by pushing laterally, with the lower rails 30, 32 lying against the base walls 39. Due to the funnel-shaped arrangement of these guide elements, packing units 12 arrive with exactly oriented packs 10, 11 in the area of the discharge conveyor 28. This extends roughly in the middle of the two turning conveyors 21, 22 here with their different widths.

The discharge conveyor 28 ensures precise transport of the packing units 12. For this purpose, an upper belt 37 is provided at least in the starting area. This has (two) stops 38. The speeds are synchronized in such a way that the incoming packing units 12 run up against one of the stops 38 and are thus aligned at the front side. The upper belt 37 with stop 38 travels part of the conveying distance with the packing unit 12, thereby stabilizing the position of the packs 10, 11. The packing units 12 are then transported to a packer to form a bulk pack such as that shown in FIG. 2.

The conveying speeds are synchronized with one another in a special manner. The feed conveyor 19 preferably runs at the same conveying speed as the subsequent turning conveyor 21. The turning conveyor 22 is driven at a lower speed. The discharge conveyor 28 has a further reduced conveying speed compared with the turning conveyor 22. The upper belt 37 is driven at the same speed as the discharge conveyor 28. The lower conveying speed of the discharge conveyor 28 ensures that the two packs 10, 11 lying on top of one another run up against the stop 38 of the discharge conveyor 28 and are thus aligned by this stop.

The device can also be employed analogously if the packs 10, 11 are delivered lying in the horizontal plane. In this case only every second pack has to be turned.

| List of Reference Numbers | |
|---|---|
| 10 | Pack |
| 11 | Pack |
| 12 | Packing unit |
| 13 | Pack element |
| 14 | Tab |
| 15 | Front wall |
| 16 | Rear wall |
| 17 | Side wall |
| 18 | Closely arranged row |
| 19 | Feed conveyor |
| 20 | Turning line |
| 21 | Turning conveyor |
| 22 | Turning conveyor |
| 23 | Segmented wheel |
| 24 | Shaft |
| 25 | Segment |
| 26 | Segment |
| 27 | Deflector |
| 28 | Discharge conveyor |
| 29 | Upper rail |
| 30 | Lower rail |
| 31 | Upper rail |
| 32 | Lower rail |
| 33 | Supplementary rail |
| 34 | Additional rail |
| 35 | Supporting rail |
| 36 | Supporting rail |
| 37 | Upper belt |
| 38 | Stop |
| 39 | Base wall |

What is claimed is:

1. A device for producing a packing unit (12) from at least two packs (10, 11) whose design allows the packs to be fitted together to form the packing unit (12), each of the packs (10, 11) in the form of a trapezoidal pack element (13) and subsequent single-sided tab (14), the packs (10, 11) being transported consecutively in aligned position by means of a feed conveyor (19), comprising:
   a turning line (20) comprising at least two turning conveyors (21, 22), turning elements for turning the packs (10, 11) relative to the turning conveyors (21, 22), and a discharge element, wherein:
   a) the first turning conveyor (21) and the second turning conveyors (22) are arranged alongside one another;
   b) the first turning conveyor (21) is a continuation of the feed conveyor (19) and the second turning conveyor (22) is arranged offset from and parallel to the first turning conveyor (21);
   c) the packs (10, 11) arriving at the turning conveyors (21, 22) are fed alternately onto the first turning conveyor (21) and the second turning conveyor (22), whereby every first of a lot of two of the packs (10, 11) arriving at the turning conveyors (21, 22) continues onto the first turning conveyor (21) and every second of the lot of two of the two packs (11) arriving at the turning conveyors (21, 22) is pushed and discharged laterally by the discharge element to the offset second turning conveyor (22);
   d) the turning elements turn at least the lot of two of the packs (10, 11) relative to the turning conveyors (21, 22), whereby the turning elements act on the packs (10, 11) during transport aligning the packs (10, 11) assigned to the packing unit (12) in a relative position corresponding to the packing unit (12) and
   e) the two packs (10, 11) assigned to the packing unit (12) are assembled by the device during transport by a transverse movement.

2. The device as claimed in claim 1 wherein the discharge element is a segmented wheel (23) having outwardly extending projections or segments (25, 26), the segmented wheel (23) and the projections or segments (25, 26) being located in a common horizontal plane, the segmented wheel (23) rotating in horizontal plane, whereby during rotational movement of the segmented wheel (23) the projections or segments (25, 26) contact sides of the second one of the packs (11) to be discharge and move the second one of the packs (11) towards the second turning conveyor (22).

3. The device as claimed in claim 1, wherein the second turning conveyor (22) is driven at a lower conveying speed than the first turning conveyor (21) and the packs (11) transported by the second turning conveyor (22) are aligned with the packs (10) of transported by the first turning conveyor (21) during the pack turning movement to form the pairs of packs (10, 11) lying alongside one another.

4. The device as claimed in claim 1, further comprising stationary guide elements, assigned to each of the turning conveyors (21, 22), that tilt the packs (10, 11) of both of the turning conveyors (21, 22) by approximately 90° during transport in opposite tilting directions.

5. The device as claimed in claim 4, wherein the guide elements support the packs (10, 11) by acting on two sides of the packs (10, 11), with the guide elements extending from the feed conveyor (19) into the turning line (20) to guide and execute the tilting movement of the packs (10, 11) in the turning line (20).

6. The device as claimed in claim 5, wherein the guide elements comprise lower rails (30, 32) that are arranged as outer guide elements for the turning conveyors (21, 22) according to the travel path of the packs (10, 11) and are located in a lower area according to the width or height of a base wall (39) of the packs (10, 11), whereby in an end section of the turning line (20) the lower rails (30, 32) effect a transverse-oriented pushing together of the packs (10, 11) to form the packing unit (12) and for alignment onto a discharge conveyor (28).

7. The device as claimed in claim 6, wherein the guide elements further comprise upper rails (29, 31), wherein the upper rails (29, 31) are located in an upper area and rest against the packs (10, 11) in the turning line (20) and the tilting movement of the packs (10, 11) is effected by an arc-shaped and downward oriented course of the upper rails (29, 31).

8. The device as claimed in claim 4, wherein the packs (10, 11) in an upper area are supported during the tilting movement by the guide elements in contact on the two sides of the packs (10, 11), the guide elements being outer upper rails (29, 31) and inner guide rails, the inner guide rails being a supplementary rail (33) and additional rail (34).

9. The device as claimed in claim 4, wherein the packs (10, 11) are guided on the two sides of the packs (10, 11) in a lower area during the tilting movement, on the outside of the packs (10, 11) by lower rails (30, 32) and on the inside of the packs (10, 11) by supporting rails (35, 36).

10. The device as claimed in claim 5, wherein the packing units (12) are aligned by a discharge conveyor (28) downstream of the turning conveyors (21, 22) by an upper belt (37) with stops (38) resting on an upper side of the packing units (12) for a side of the packing units (12) lying forwards in the transport direction.

11. The device as claimed in claim 10, wherein the discharge conveyor (28) runs at a reduced conveying speed compared with the turning conveyors (21, 22).

* * * * *